United States Patent [19]

Appelgren et al.

[11] Patent Number: 4,770,625

[45] Date of Patent: Sep. 13, 1988

[54] EXTRUSION APPARATUS

[75] Inventors: Curt H. Appelgren, Kungsbacka; Nemo Ivarsson, Enskede, both of Sweden

[73] Assignee: Lejus Medical Aktiebolag, Molndal, Sweden

[21] Appl. No.: 829,655

[22] PCT Filed: Apr. 2, 1985

[86] PCT No.: PCT/SE85/00155

§ 371 Date: Dec. 2, 1985

§ 102(e) Date: Dec. 2, 1985

[87] PCT Pub. No.: WO85/04367

PCT Pub. Date: Oct. 10, 1985

[30] Foreign Application Priority Data

Apr. 2, 1984 [SE] Sweden .............................. 8401802

[51] Int. Cl.[4] .............................................. B29C 47/00

[52] U.S. Cl. .......................... 425/331; 425/DIG. 230

[58] Field of Search ...................... 425/DIG. 230, 331

[56] References Cited

U.S. PATENT DOCUMENTS 2,144,054 1/1939 Hall .................................... 425/331

2,160,302 5/1939 Billows ...................... 425/DIG. 230

2,295,743 9/1942 Meakin ..................... 425/DIG. 230

3,166,026 1/1965 Crane ................................. 425/331

3,511,190 5/1970 Kunz ......................... 425/DIG. 230

3,758,563 9/1973 Uematsu et al. .................... 425/331

FOREIGN PATENT DOCUMENTS 347637 8/1960 Switzerland ........................ 425/331

844057 8/1960 United Kingdom ................ 425/331

*Primary Examiner*—Willard E. Hoag

*Attorney, Agent, or Firm*—Burns, Doane, Swecker & Mathis

[57] ABSTRACT

The present invention relates to an apparatus and a method for extrusion of plastic or pulverulent materials having been prepared for the purpose for obtaining an extrudate in the form of rod shaped bodies, whereby the apparatus comprises an annular perforated screen (8), a rotor (10) being rotably arranged on the inside of said perforated screen (8), The rotor (10) is provided with a number of compression surfaces (14) working in close rotation to said perforated screen (8), which surfaces (14) are arranged with an acute angle with said perforated screen (8) in their rotational direction.

10 Claims, 5 Drawing Sheets

FIG. 5
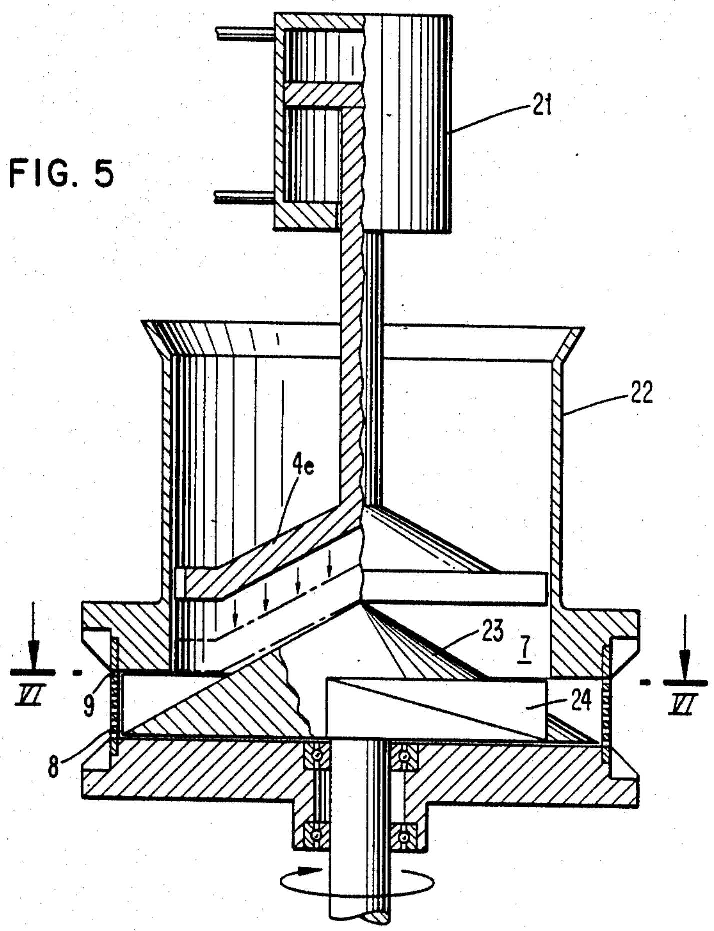
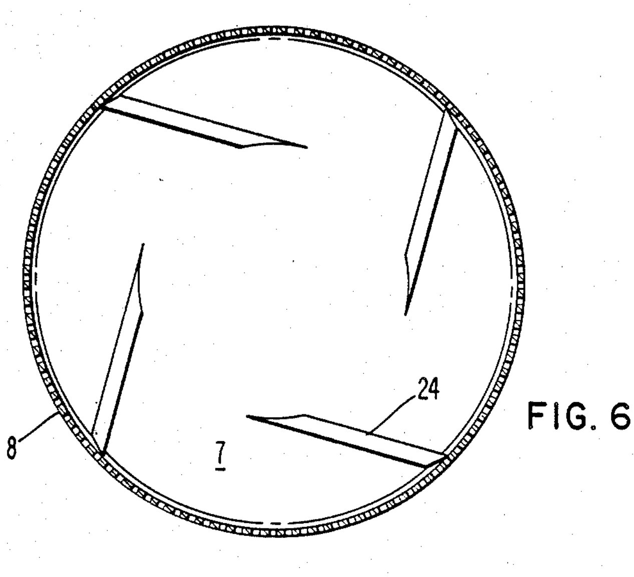
FIG. 6

EXTRUSION APPARATUS

TECHNICAL FIELD

The present invention relates to an apparatus and a method for extruding plastic or pulverulent materials prepared for the purpose of obtaining an extrudate in the form of rod shaped bodies.

The object of the present invention is to obtain a possibility to extrude plastic or pulverulent materials prepared for the purpose (semimoist) (15–45% by weight of water) to the formation of an extrudate without using any substantial compressing or pressure forces in the materials which forces increase the temperature while extruding. The extrudate obtained can be used as such, or be further treated.

BACKGROUND OF THE INVENTION

It is previously known apparatuses for extruding plastic deformable or pulverulent materials (semimoist) which have been prepared for the purpose for the production of extrudates of different kinds, such as raw materials, or end products for the pharmaceutical, food, or feed-stuff industries, as well as for the production of fertilizers and other organic and inorganic products.

Hitherto known apparatuses having been used for extrusion said materials are to be compared with meat mincing-machines, where the material by means of one or more screws is fed and pressed up to and through an aperture disc, which can be axially or radially arranged. Already the physical action of the screws makes this method irrational and provides for shearing forces in the material with accompanying heating effects, which in most cases are destructive. Furthermore, the material is graded into a solid/liquid phase prior to the aperture disc, which results in an inhomogenous product. The pressure force needed according to this method is further applied onto the whole area of the aperture disc, which after a short time leads to a deformation of the aperture disc. This deformation is particularly annoying at aperture diameters of 1 mm and less, when the screen (aperture disc) by deformation goes away from the screw(-s) and the forming effect of these, which means that the load has to be further increased.

The disadvantage of this known technique for extruding plastic deformable or pulverulent materials prepared for the purpose is as mentioned above that too high a temperature is built up during too long a period which in many cases means a destruction, or at least a serious risk for destruction of the material fed, particularly when organic material is present. Also inorganic materials can, however, change, e.g., by release of chemically bound water, which can completely change the chemical and physical properties of the product at hand.

Demands have thus been brought forward requesting a device and a process which provides for the production of an extrudate of heat- and pressure sensitive materials for obtaining well formulated extrudates by extrusion, while avoiding temperature increasing compression and pressure forces during a substantial time period, within the material.

DESCRIPTION OF THE PRESENT INVENTION

It has now surprisingly been shown possible to be able to produce extrudates by extrusion by means of the present invention, which is characterized by an annular perforated screen, a rotor being rotably arranged on the inside of said perforated screen, which rotor is provided with a number of compression surfaces working in close rotation to said perforated screen, which surfaces are arranged with an acute angle with the perforated screen in their rotational direction.

Further characteristics are apparent from the accompanying claims.

By means of the present invention plastic materials or pulverulent materials having been prepared for the purpose, which are fed into the rotor, will be compressed during a very short period of time at the very utmost ends of compression surfaces towards the perforated screen, only, and be pressed through the perforated screen by means of the stopping up effect. The compression forces on the perforated screen will thereby be located along the lines where the compression surfaces touch the perforated screen. The force on the perforated screen is thus, totally, only a fraction of what is obtained at known apparatuses and methods. An increase of the temperature of 0° to 1° C. has thereby been able to be determined compared with 30° to 40° C., which is common in a conventional extrusion apparatus.

The present invention will be described more in detail in the following with reference to the attached drawing, wherein FIG. 1 shows a preferred embodiment of the invention in a cross-section through its longitudinal axis;

FIG. 5 shows a further, preferred embodiment of the invention in cross-section through its longitudinal axis;

FIG. 6 shows a horizontal cross-section through the apparatus according to FIG. 5 along the line VI—VI;

Figure 1:
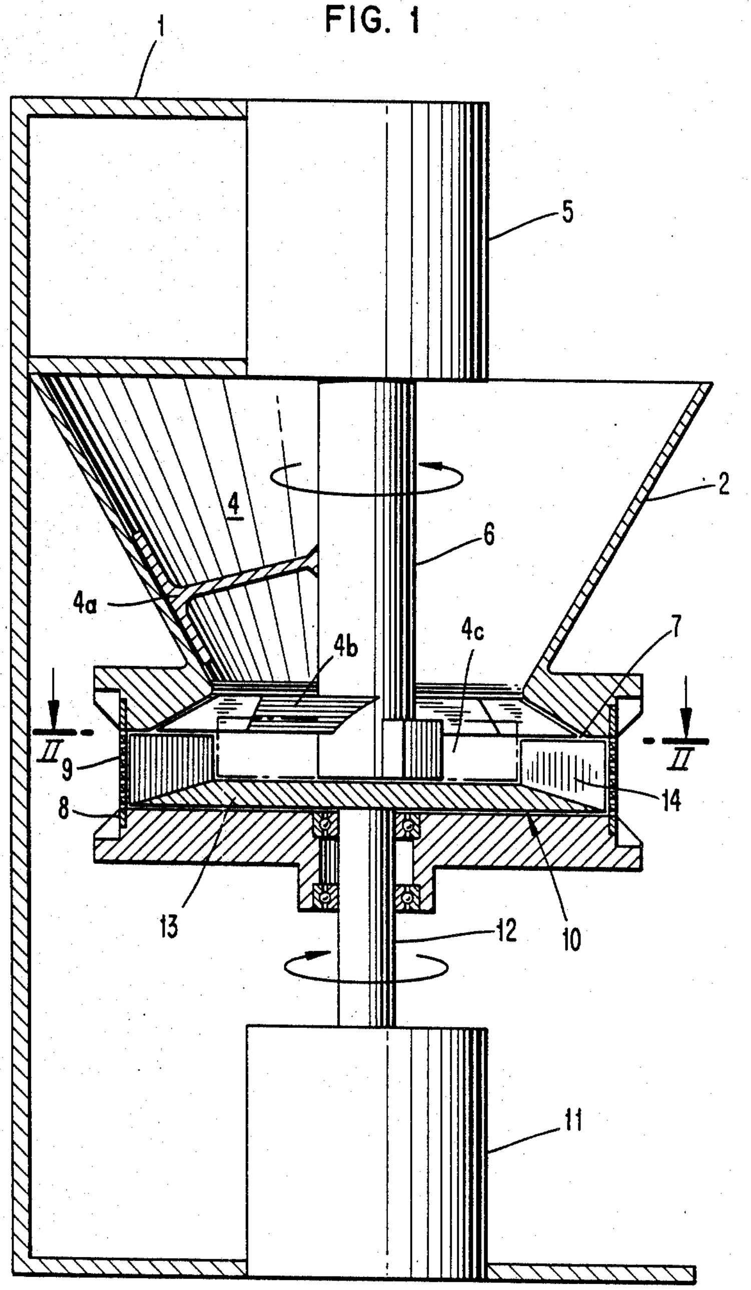
Figure 2:
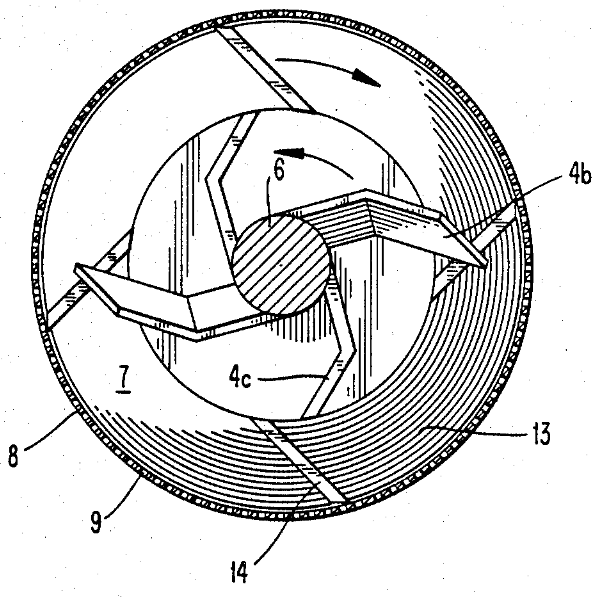
FIG. 2 shows a horizontal cross-section through the apparatus of FIG. 1 along the line II—II.

1 denotes a stand, which in its upper part carries a conical funnel 2 provided with a feeding opening. In the lower part of the funnel 2 there is a feeding means 4 being rotably arranged. The feeding means 4 is thereby arranged to a motor 5 and its outgoing shaft 6. The feeding means 4 of the embodiment of FIGS. 1 to 2 is particularly designed for feeding a material having difficulties in flowing, whereby it comprises a scraper 4*a*, which is arranged for scraping off material (goods) from the lower part of the funnel 2, and an upper feeder 4*b* and a lower feeder 4*c*. The upper feeder 4*b* is in the form of a somewhat backwardly sweeping, forwardly angled double-blade, while the lower feeder 4*c* is in the form of a partly backwardly sweeping, vertically arranged double-blade. The term forwardly angled used above means that the blade 4*b* is arranged with an angle to the vertical plane. Below the funnel 2, which is open straight through, and in the vicinity of the feeders 4*b* and 4*c* an extrusion chamber 7 is arranged. The extrusion chamber 7 being cylindrically, annularly designed is provided with through-going apertures 9 along its whole jacket surface 8, which apertures 9 have a diameter and thickness of 1 mm, in the present example, to the formation of a perforated screen. The perforated screen 8 is made of an acid proof material (steel) for maximal anti-corrosion life and hygienic standard. Another suitable material is aluminum bronze. In the extrusion chamber 7 a rotor 10 in the form of a substantially planar disc is rotably arranged. The rotor 10 is connected to the outgoing shaft 12 of a second motor 11, to rotate with a speed of 40 to 60 rpm. The rotor 10 comprises as mentioned a circular, solid, substantially flat disc 13 having the same diameter as the extrusion chamber 7. On this disc 13 four rotor blades 14 are arranged with a division of 90° between each. The number of rotor blades 14 can be varied and can be 2, 3, 4, 5, 6, or 8. However, four rotor blades are preferred. The disc 13 is in outer part, on which the blades 14 are arranged, outwardly sloping so that material coming in into the centre falls outwardly. The feeding means 4 and the rotor 10 are arranged for rotation directions opposite to each other. The rotation directions have been indicated with arrows in the figures. The feeder 4*b* will hereby bring away material from the upper edges of the blades 14, while the lower feeder 4*c* will bring away material from the disc 13 and outwardly, and sweep off the rotor blades 14 on their inner vertical edges.

The rotor blades 14 are arranged to be close fitting to the perforated screen 8, i.e., with a minimum gap between the blades 14, and the perforated screen 8 (50–100 μm). The rotor blades 14 form an acute angle to the point of the tangent of the blade to the perforated screen 8. This angle is about 75°, but can also be larger or smaller depending on the compression wanted. 20° to 80° is, however, a preferred value for this angle, 30° to 60° being a more preferred value.

Figure 4:
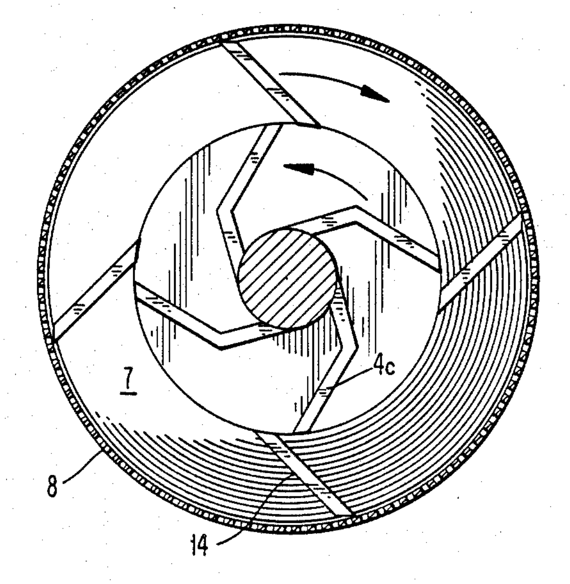
FIG. 4 shows a horizontal cross-section through the apparatus according to FIG. 3 along the line IV—IV.
Figure 3:
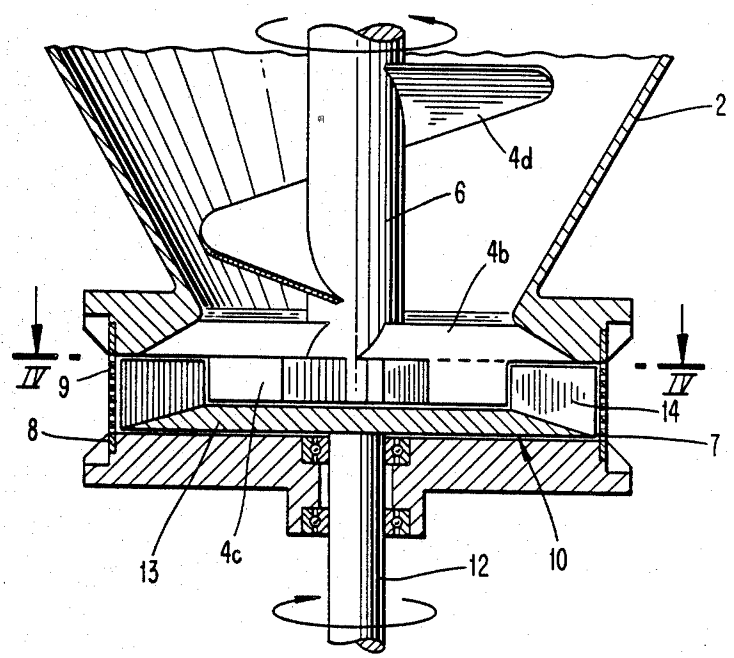
FIG. 3 shows another preferred embodiment of the invention in cross-section through its longitudinal axis.

In FIGS. 3 to 4 there is shown an embodiment, wherein the feeding means 4 comprises a feeding screw 4*d*, which by means of the rotation of the shaft 5 will raise the material, which then falls down towards a lower feeder 4*b*, which comprises four, partly backwardly sweeping blades. Feeding means 4 are particularly designed for easily flowing pulverulent material that shall be formed into an extrudate. The rotor 10 with its rotor blades 14 is in other respects the same as in the embodiment of FIGS. 1 to 2. The driving shafts 6, and 12 are, as in FIGS. 1 to 2, rotating in opposite directions to each other, so that the material which is fed through the feeding means 4, is not pressed down into the extrusion chamber.

In FIGS. 5 to 6 there is shown an embodiment for batch-wise production of an extrudate, whereby a cylindrical container 22 is arranged to receive a certain, given amount of a material. A feeding means is axially, displaceably arranged by means of a hydraulic, or pneumatic, alternatively, actuated pressure cylinder 21. The feeding means comprises a conical feeder 4*e*, which tightly fits to the container 22. Below the container 22 an extrusion chamber 7 is arranged, which comprises an annular perforated screen 8, and a conical rotor 23 arranged rotably therein. The conicity of the rotor 23 corresponds to the conicity of the feeder 4*e* so that the feeder 4*e* in its lowest point will be placed close to the rotor 23. Four rotor blades 24 are arranged to the rotor 23. The rotor 23 is driven via a shaft 12 connected to a motor, not shown.

Figure 7:
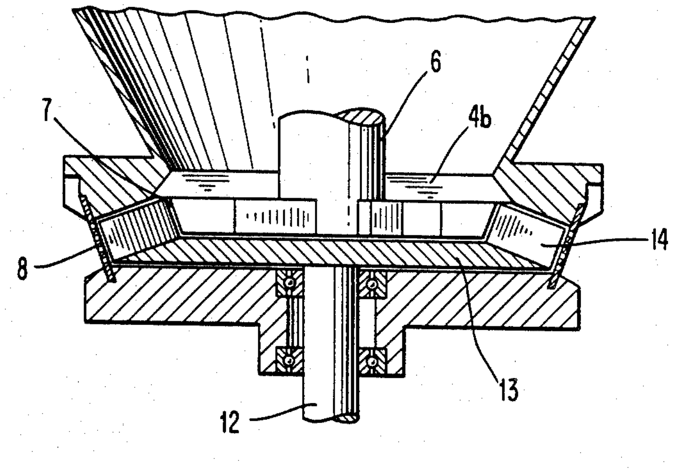
FIG. 7 shows another further embodiment of the invention in cross-section through its longitudinal axis.
Figure 8:
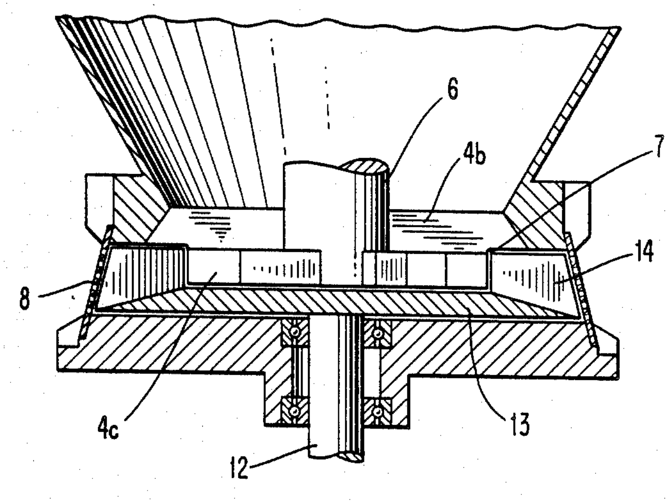
FIG. 8 shows a further embodiment of the invention in cross-section through its longitudinal axis.

In FIGS. 7 to 8 there is shown two alternative embodiments of the perforated screen 8, and thereby the rotor blades 14. The perforated screens 8 are conically designed; in FIG. 7 with its smaller diameter turned upwardly; and in FIG. 8 with its smaller diameter turned downwardly. The rotor blades 14 are hereby fitted to the different angles of the perforated screens 8 to the vertical plane.

The apparatus of the present invention works in the following manner: Semimoist pulverulent material having a moisture contents of 15 to 45% by weight, and the consistency of wet snow is fed through the hopper 2 into the feeding means. The material is then brought down into the extrusion chamber 7 using an axially/-radially movement in one rotational direction, and when it has come into the extrusion chamber 7 the rotational direction is changed. as well as the material is pressed outwardly in a radial, horizontal direction by means of the rotor blades 14 towards the perforated screen 8. Immediately prior to the perforated screen, the material will be pressed into the corner between the rotor blade and the perforated screen, and there becomes compressed, and pressed out through the apertures of the perforated screen to the formation of rods having a diameter, in the present example, of 1 mm, and a length of 15 to 20 mm. In the case of a pharmaceutically active composition being extruded it is then transferred into a spheronizing apparatus, wherein the extrudate is brought apart and reshaped into spherical particles.

The apparatus according to the present invention, FIGS. 1 to 4, works continuously, while it works batch-wise in the embodiment of FIGS. 5 to 6. The feeding means feed materials to the rotor blades (compression wings) under completely controllable conditions, while the material is pressed out through the perforated screen. The rotor blades will function as compression surfaces in the moment of extrusion.

The apparatus is vertically arranged in order to provide for an even distribution of the material over the feeding means.

The feeding means are, as evident from above, so constructed that the material becomes distributed as close as possible to the rotor blades 14, particularly the compression surfaces of the rotor blades in order to thereby provide as small and short effects as possible onto the material.

The feeding means are, as given above, rotated in a direction opposite to the direction of the rotor blades. The rotational speed of the feeding means can thereby be varied, and adapted to the material, which, for the moment being, is to be extruded. The feeding effect of the apparatus for batch-wise extrusion is regulated by means of the pressure upon the pressure cylinder.

In the embodiment according to FIGS. 1 to 2 the material is fed both radially and axially outwardly and downwardly by the two feeders 4*a* and 4*b*, between the rotor blades 10. A material accumulation on the rotor blades 10 is prevented by changing feeding forces axially/radially. As said above this embodiment is preferred using materials with adhesive and/or hardly flowing characteristics.

In the embodiment according to FIGS. 3 to 4 the material is, all the time, raised upwardly in the centre by the screw blade in order to be loosened up, whereupon it is fed radially outwardly by the feeder 4*c*. This embodiment is preferred using easily flowing, non-adhesive materials.

In the embodiment of FIGS. 5 to 6 the feeding means is in the form of a pressure and speed controllable cylinder feeding system in order to readily extrude small, determined quantities of materials, e.g., for laboratory purposes. The rotor blades 14 are attached onto the conical centre in order to allow the material to be fed more easily towards the periphery, i.e., to obtain both a radially and an axially feeding. The feeding cylinder is also adapted to fit with the rotor in order to leave as little as possible of residual material left in the apparatus.

In the embodiments of FIGS. 1 to 4, and 7 to 8, the rotor has a certain conical shape. This has been done for practical reasons to allow the rotor blades to end in an edge close to the perforated screen 8, and thereby to expose the largest possible perforated screen area to the rotor blades.

It is essential to the functioning of the present apparatus that the plane compression surfaces are rotated in an area of the feeding area comprising an annular area having the width of 0.5 to 0.05 of the radius of the perforated screen 8. The compression surfaces covers preferably a width of 0.5 to 0.2 of the radius of the perforated screen. The angle of the compression surfaces shall be 20° to 80°, preferably 30° to 60°. Further radial, as well as axial feeding shall be carried out. The peripheral speed of the compression surfaces shall be 0 to 1 m/s, preferably 0.3 to 0.8 m/s, and more preferably 0.4 to 0.6 m/s. A further essential structure is that the upper feeder **4*b* shall extend over the compression surfaces 14, if such a feeder is used. Further, the feeders 4*b* and 4*c*** shall rotate in a direction opposite that of the compression surfaces.

By means of the present invention a very small torque is needed to obtain a good troughput/extrusion; a great temperature increase is avoided in the mass treated, whereby the temperature is increased marginally, only immediately prior to extrusion; and a build up of a water gradient in the material is thereby avoided, which in turn leads to a very homogenous, extruded product having improved tensile properties in e.g., a subsequent treatment in a spheronizer.

What is claimed is:

1. An apparatus for extruding plastic or pulverulent material to obtain an extrudate in rod-shaped form, said apparatus comprising:

(a) an annular wall with perforations therein;

(b) a rotor which is rotably arranged on the inside of said annular wall;

(c) a plurality of planar compression surfaces on the rotor, said compression surfaces terminating in close proximity to the annular wall and forming an annular zone having a width that is 0.05 to 0.5 times the diameter of the annular wall, said compression surfaces further being arranged to form an acute angle with a tangent of the annular wall in the rotational direction at all points of the annular wall;

(d) means for feeding material at least one of axially or radially to and along said compression surfaces whereby the feeding is at least partly conducted over said annular zone; and (e) said rotor being a flat plate-like truncated cone having plural flat blades mounted edgewise to conical surfaces thereof and plural counter-rotatable blades being mounted to rotate above said flat blades.

2. The apparatus of claim 1 wherein the rotor is conically shaped and the means for feeding material is conically shaped and conforms to the shape of the rotor.

3. The apparatus of claim 1 wherein a feeding opening is arranged toward the rotor and said opening is provided with a rotatable feeding means.

4. The apparatus of claim 3 wherein the rotor and the feeding means are rotably arranged with opposite rotational directions.

5. The apparatus of claim 1 wherein the rotor and the feeding means are rotably arranged with opposite rotational directions.

6. The apparatus of claim 1 wherein the acute angle is from 20° to 80°.

7. The apparatus of claim 1 wherein the acute angle is from 30° to 60°.

8. The apparatus of claim 1 wherein the number of compression surfaces ranges from two to eight.

9. The apparatus of claim 1 wherein the annular wall is cylindrical in shape.

10. The apparatus of claim 1 wherein the annular wall is frustaconical in shape.

* * * * *